United States Patent
Svenson et al.

(10) Patent No.: US 7,044,529 B2
(45) Date of Patent: May 16, 2006

(54) ARTICULATING DOOR FOR A STORAGE COMPARTMENT

(75) Inventors: Richard Svenson, Northville, MI (US); Michael D. Filipowski, Pinckney, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 11/238,723

(22) Filed: Sep. 29, 2005

(65) Prior Publication Data

US 2006/0066120 A1 Mar. 30, 2006

Related U.S. Application Data

(60) Provisional application No. 60/614,772, filed on Sep. 30, 2004.

(51) Int. Cl.
*B60N 3/12* (2006.01)

(52) U.S. Cl. .................. 296/37.8; 296/37.12

(58) Field of Classification Search .............. 296/37.8, 296/37.9, 37.12, 37.13, 70, 24.34
See application file for complete search history.

(56) References Cited

U.S. PATENT DOCUMENTS

| | | |
|---|---|---|
| 4,596,416 A | 6/1986 | Muller |
| 5,172,969 A | 12/1992 | Reuter et al. |
| 5,409,308 A | 4/1995 | Reuter et al. |
| 5,797,219 A | 8/1998 | Croswell |
| 5,887,930 A * | 3/1999 | Klein ...................... 296/37.12 |
| 5,951,083 A * | 9/1999 | Bittinger et al. ......... 296/37.12 |
| 6,111,725 A | 8/2000 | Christie |
| 6,131,242 A * | 10/2000 | Zipperle et al. ........... 296/37.8 |
| 6,176,534 B1 | 1/2001 | Duncan |
| 6,224,480 B1 | 5/2001 | Le et al. |
| 6,259,067 B1 | 7/2001 | Faries, Jr. et al. |
| 6,347,988 B1 | 2/2002 | Kurokawa et al. |
| 6,453,991 B1 | 9/2002 | Tsurushima et al. |
| 6,609,631 B1 | 8/2003 | Asami |
| 6,629,716 B1 * | 10/2003 | Shibata et al. ................ 296/70 |
| 6,695,691 B1 | 2/2004 | Le |
| 6,761,393 B1 | 7/2004 | Durand et al. |
| 6,814,137 B1 | 11/2004 | Tsurushima et al. |
| 6,881,140 B1 | 4/2005 | Le |
| 2003/0080131 A1 * | 5/2003 | Fukuo ..................... 296/37.12 |
| 2004/0051333 A1 * | 3/2004 | Brown et al. ............ 296/37.12 |

* cited by examiner

Primary Examiner—Jason Morrow
(74) Attorney, Agent, or Firm—Honigman, Miller, Schwartz and Cohn, LLP

(57) ABSTRACT

An interior trim component includes at least one arcuate guide flange that rotatably mounts a door to a stowage compartment. The stowage compartment includes a pair of opposing side walls having at least one arcuate guide and at least one arcuate track member. At least one pivot stud extends from the door and passes through the at least one arcuate guide. The at least one arcuate guide flange is secured to the at least one pivot stud for rotatably mounting the door to the storage compartment. The at least one arcuate guide flange rotatably engages the at least one arcuate track member. A method for moving the door is also included.

6 Claims, 4 Drawing Sheets

ARTICULATING DOOR FOR A STORAGE COMPARTMENT

RELATED APPLICATIONS

This application claims the benefit of U.S. Provisional Application No. 60/614,772, filed Sep. 30, 2004, the contents of which are incorporated by reference.

TECHNICAL FIELD

The present disclosure generally relates to stowage assemblies. More particularly, the disclosure relates to an articulating door and at least one guide flange that is rotatably mounted to a stowage compartment.

BACKGROUND

It is known in the art that vehicles include stowage assemblies, such as, for example, glove boxes, ash trays, coin trays, and the like. Such stowage assemblies may be located, for example, about an armrest, a center console, an instrument panel area, or the like. Known stowage assemblies include a door that may be moved to and from closed and open positions. Although adequate for most situations, such known doors may be pivotably deployed with a spatially-fixed axis of rotation, which may undesirably result in a limited stowage capacity potential of the stowage compartment. As such, a need exists for improving stowage assemblies to maximize stowage capacity potential.

BRIEF DESCRIPTION OF THE DRAWINGS

The inventors have recognized these and other problems associated with conventional stowage assemblies. The present disclosure will now be described, by way of example, with reference to the accompanying drawings, in which.

DESCRIPTION OF THE PREFERRED EMBODIMENT

Figure 1:
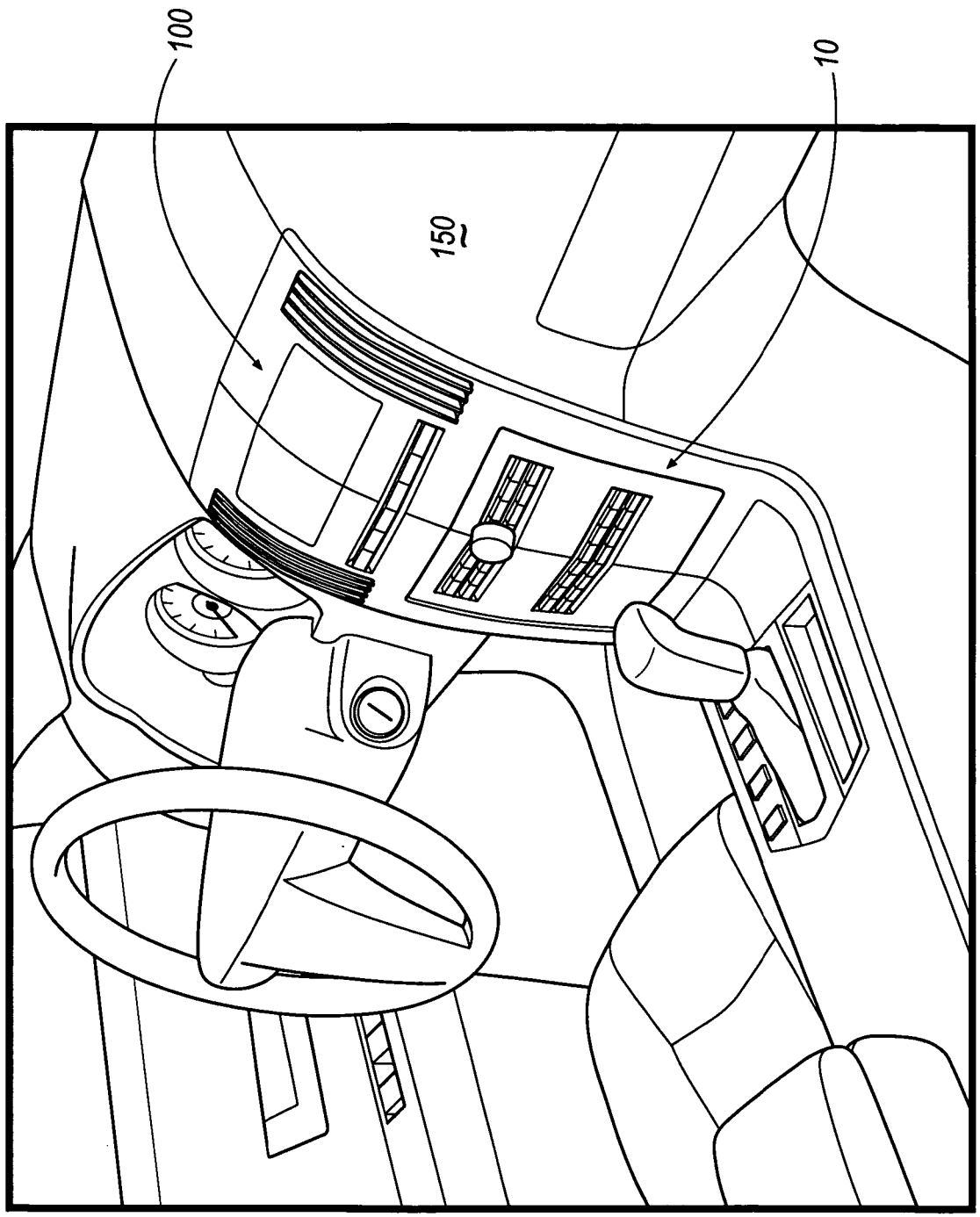
FIG. 1 is a passenger compartment view of a center console including a stowage assembly according to an embodiment.
Figure 2A:
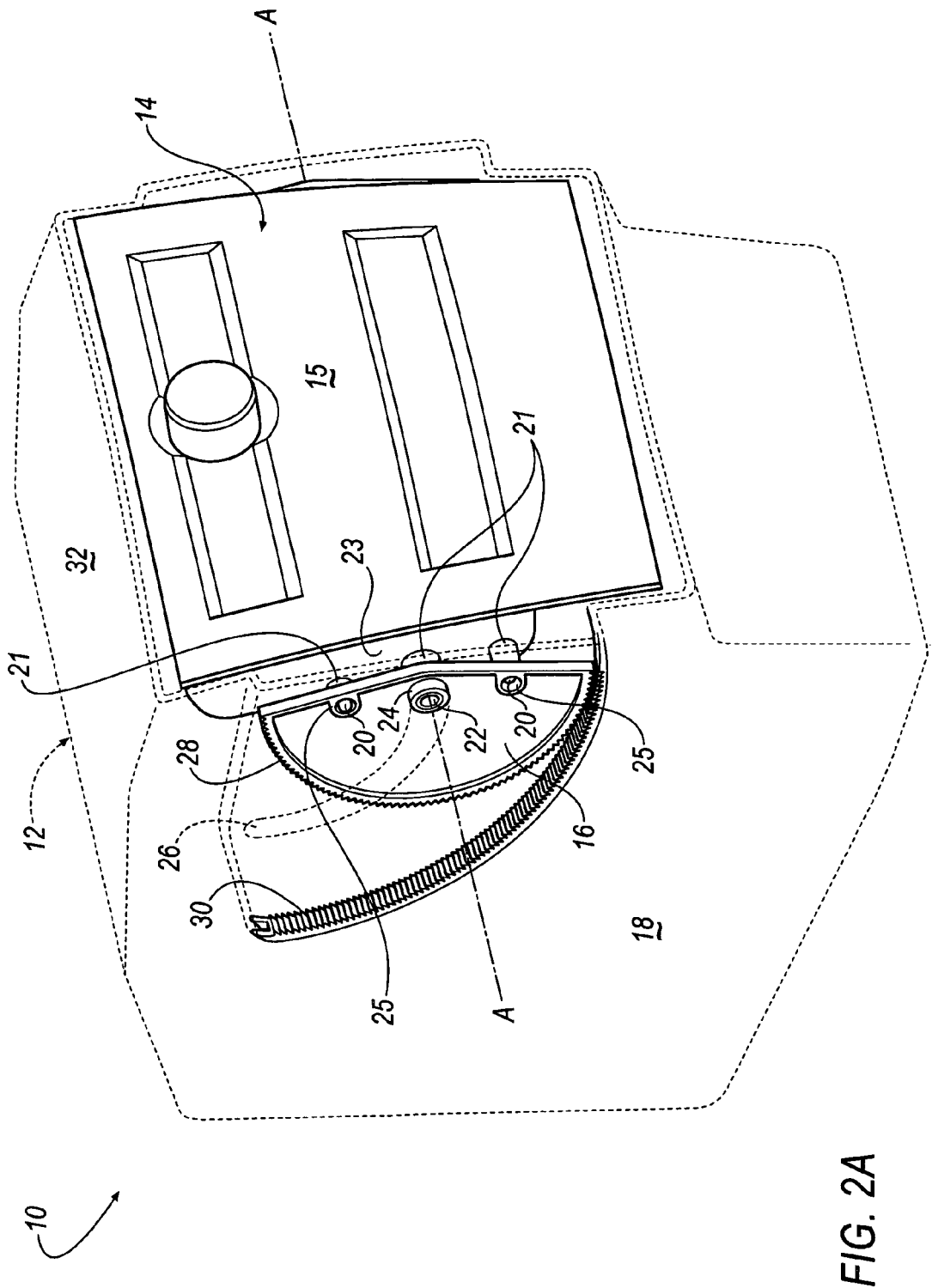
FIG. 2A is a perspective view of a stowage assembly including a door in a closed position according to an embodiment.
Figure 2B:
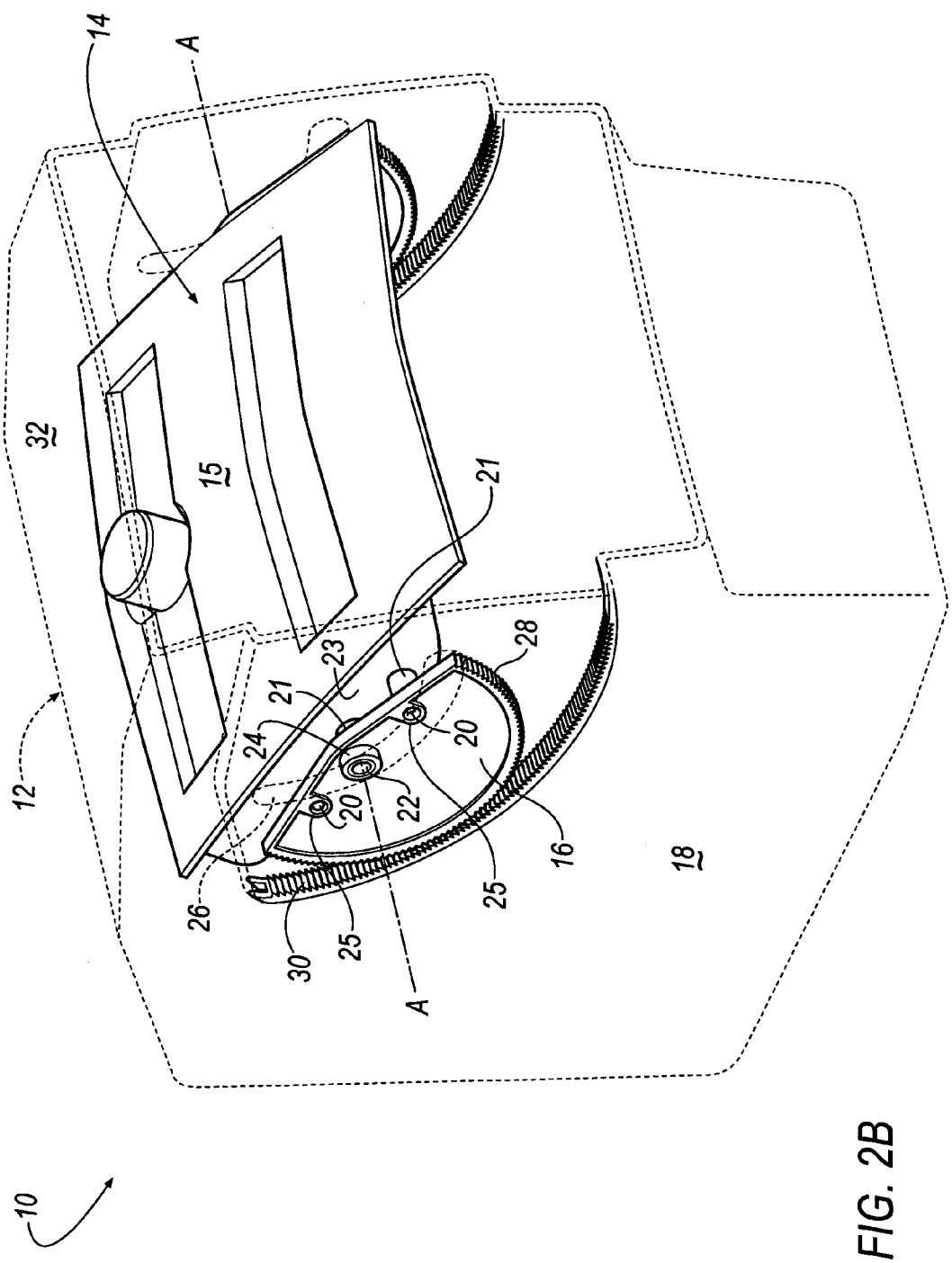
FIG. 2B is a perspective view of the door moved from the closed position according to the stowage assembly of FIG. 2A.
Figure 2C:
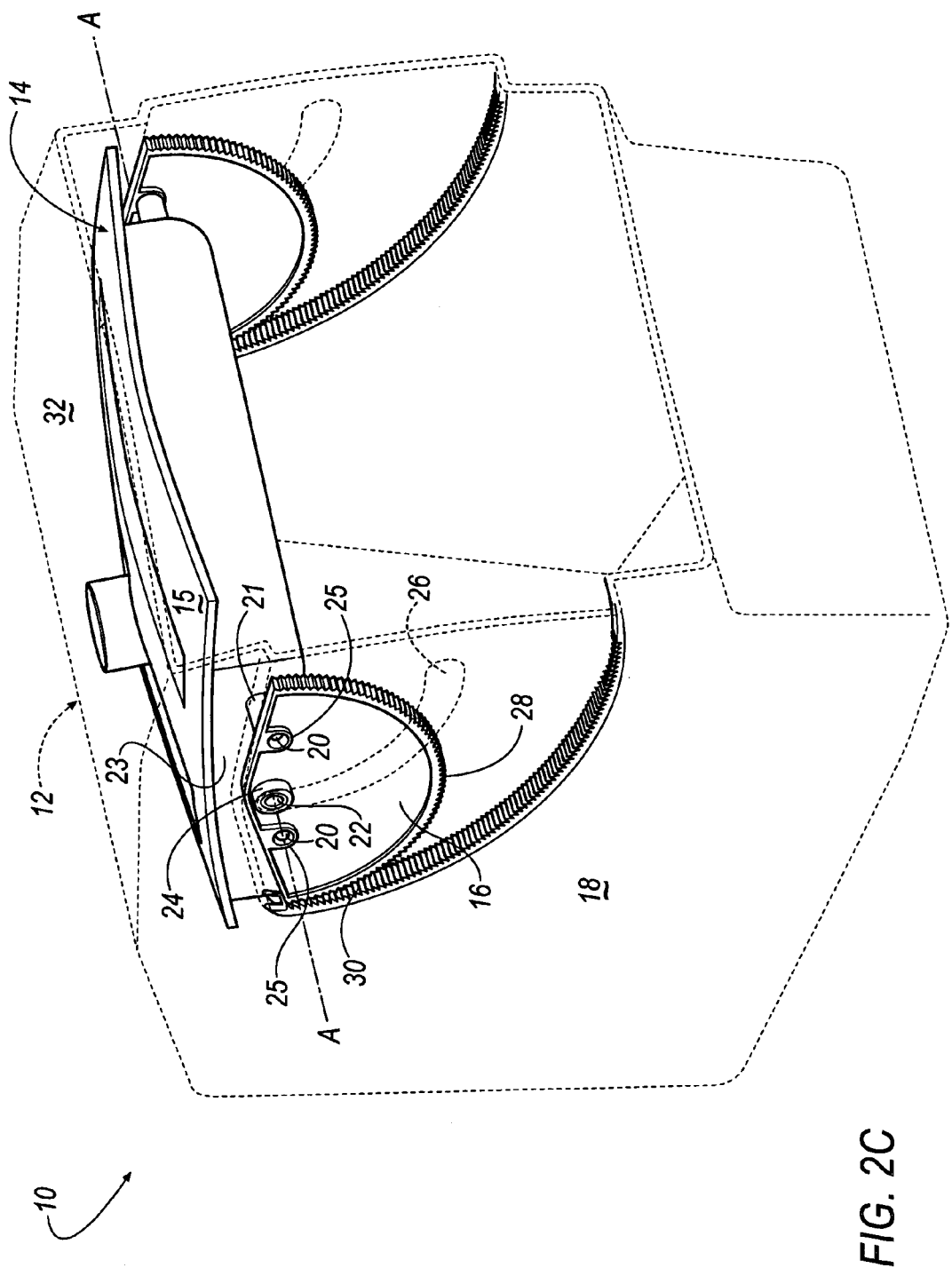
FIG. 2C is a perspective view of the door moved to another position according to the stowage assembly of FIG. 2B.

The above described disadvantages are overcome and a number of advantages are realized by an inventive stowage assembly, which is seen generally at 10 in FIGS. 1–2C. In general, the stowage assembly 10 is disposed in a center console or center stack 100 of a dashboard or instrument panel area 150 of a vehicle. However, it will be appreciated that the stowage assembly 10 is not limited to the center console location and that the stowage assembly 10 may be positioned at any desirable location of the vehicle, such as, for example, the glove box area, a rear-quarter-panel area, an armrest-area, or the like. In addition, the stowage assembly 10 may be used to conceal features, such as a secondary storage compartment (e.g., a sunglasses holder), electronic components, or the like.

Referring to FIG. 2A, the stowage assembly generally comprises a stowage compartment 12 and a door 14 having a front panel 15. The door 14 is mounted, in a fixed relationship, to a pair of arcuate guide flanges 16. As illustrated, each arcuate guide flange 16 is positioned on opposite side walls 23 of the door 14. Each arcuate guide flange 16 includes an outer edge of teeth 28 that correspondingly mesh with arcuate, toothed track members 30 formed in opposing sidewalls 18 of the stowage compartment 12 to permit the door 14 to be rotatably mounted to the stowage compartment 12.

The stowage compartment 12, door 14, and arcuate guide flanges 16 may be formed from any desirable material, such as, for example, a plastic material including but not limited to Acrylonitrile-butadiene-styrene (ABS), polypropylene (PP), thermoplastic olefin (TPO), stryrene block co-polymer (SEBS), thermoplastic polyurethane (TPU), polyethylene terepthalate (PET), cross-linked polyolefin (XLPO), or the like. In the illustrated embodiment, the arcuate guide flanges 16 are substantially semi-circular in shape. However, the arcuate guide flanges 16 may have any desirable shape, depending on particular design considerations.

As illustrated, the door 14 is connected to each arcuate guide flange 16 with at least one mounting stud 20 and at least one pivot stud 22. According to the illustrated embodiment, each opposing side wall 23 of the door 14 includes two mounting studs 20 and one pivot stud 22. The mounting studs 20 and pivot studs 22 extend from outboard projections 21 proximate the opposing sidewalls 23 of the door 14. If desired, the outboard projections 21 may have a larger diameter than the mounting and pivot studs 20, 22 to resist shear forces that may be applied to the door 14. As illustrated, each pivot stud 22 and mounting stud 20 are positioned, respectively, within a pivot flange 24 and a mounting flange 25 of each arcuate guide flange 16. When affixed in this manner, movement of each arcuate guide flange 16 about the arcuate, toothed track members 30 causes a corresponding movement of the door 14.

According to another embodiment, it will be appreciated that the outboard projections 21 may be eliminated, and the mounting and pivot studs 20, 22 may extend directly from each opposing side wall 23 of the door 14. According to another embodiment, the arcuate guide flanges 16 may be integrated with the door 14 such that arcuate guide flanges 16 maybe be formed with the opposing side walls 23 of the door 14 such that the arcuate guide flanges 16 and door 14 are formed together as one component of the same material. According to the illustrated embodiment, upon affixing the arcuate guide flanges 16 to the door 14 as described above, the pivot flanges 24 are slidably located in opposing arcuate guides 26 that are formed in the opposing inner side-walls 18 of the stowage compartment 12. Then, upon locating the pivot flanges 24 in the arcuate guides 26, the outer edge of teeth 28 of the arcuate guide flanges 16 correspondingly mesh with the arcuate, toothed track members 30. As illustrated, the arcuate, toothed track members 30 are concentric to and equidistantly spaced from the arcuate guides 26.

Once assembled as described above, the door 14 is permitted to be pivotably deployed relative the stowage compartment 12. As illustrated, a pivot axis, which is generally shown at A—A, extends through each pivot stud 22 and is bound by the slidable movement of the pivot flange 24 within the arcuate guide 26 as the arcuate guide flanges 16 are rotated about the arcuate, toothed track members 30. The pivot axis, A—A, is not a spatially fixed axis, but rather, the pivot axis, A—A, moves in a non-linear fashion as the door 14 is moved to and from opened and closed positions relative the stowage compartment 12. As such, the location of the pivot axis, A—A, may be adjusted from a first position (e.g., as seen in FIG. 2A) to a second position (e.g., as seen in FIG. 2B or 2C) about the arcuate guides 26 as the arcuate guide flanges 16 rotate about the arcuate, toothed track members 30.

Referring to FIG. 2C, because the pivot axis, A—A, moves in such a manner, the door 14 may be located substantially adjacent an upper interior portion 32 of the stowage compartment 12. Accordingly, the door 14 may be substantially drawn into the stowage compartment 12, and, as a result, is less obstructive when depositing or removing items therein. Thus, by locating the door 14 substantially adjacent the upper interior portion 32 within the stowage compartment 12, the design of the stowage assembly 10 maximizes a considerable amount of volume for the stowage of items in the stowage compartment 12 in view of the pivoting movement of the door 14.

Although not illustrated, the stowage assembly 10 may include additional features that effects the movement of the door 14. For example, movement of the door 14 may be damped or enhanced by the inclusion of a spring, counterweight, motor, or the like. Even further, although the illustrated stowage compartment 12 includes non-linear, arcuate guides 26 and non-linear, arcuate toothed track members 30, it will be appreciated that the door 14 may be adjusted about guides and track members including other design shapes. For example, the guides and track members may be defined to include substantially linear, parallel configuration such that the door 14 may be moved in a generally linear, sliding motion as the door 14 is opened and closed relative the stowage compartment 12. Accordingly, the arcuate guide flanges 16 may take on any desirable shape and form, such as, for example, a round gear having a toothed circumference, to accommodate an alternative design of the stowage compartment 12.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An interior trim component, comprising:
   a storage compartment including a pair of opposing side walls, said side walls including at least one arcuate guide and at least one arcuate track member;
   at least one pivot stud extending from a door, wherein the at least one pivot stud passes through said at least one arcuate guide; and
   at least one arcuate guide flange secured to said at least one pivot stud for rotatably mounting the door relative the storage compartment, said at least one arcuate guide flange rotatably engaging the at least one arcuate track member.

2. The interior trim component according to claim 1, wherein the at least one arcuate guide flange includes an outer edge of teeth that correspondingly mesh with teeth formed on the at least one arcuate track member.

3. The interior trim component according to claim 1, wherein the at least one pivot stud is secured in at least one pivot flange of the at least one arcuate guide flange, wherein the at least one pivot flange slidably passes through the at least one arcuate guide.

4. The interior trim component according to claim 3, wherein a non-spatially fixed pivot axis (A—A) of the door extends through the at least one pivot stud and the at least one arcuate guide.

5. The interior trim component according to claim 1 further comprising at least one mounting stud extending from the door, wherein the at least one mounting stud is secured to at least one mounting flange of the at least one arcuate guide flange.

6. A method for moving a door rotatably-mounted to a stowage compartment by at least one arcuate guide flange, comprising the steps of:
   rotating the at least one arcuate guide flange about at least one arcuate track member of the stowage compartment;
   slidably passing at least one pivot flange of the of the at least one arcuate guide flange within an arcuate guide of the stowage compartment; and
   moving the location of a pivot axis (A—A) extending through at least one pivot stud of the door, wherein the pivot stud is positioned in the at least one pivot flange.

* * * * *

UNITED STATES PATENT AND TRADEMARK OFFICE
CERTIFICATE OF CORRECTION

PATENT NO. : 7,044,529 B2 Page 1 of 1
APPLICATION NO. : 11/238723
DATED : May 16, 2006
INVENTOR(S) : Richard Svenson et al.

It is certified that error appears in the above-identified patent and that said Letters Patent is hereby corrected as shown below:

Column 2, line 48, change "maybe be" to --may be--.

Column 4, claim 6, line 40, change "of the of the at least" to --of the at least--.

Signed and Sealed this

Fifteenth Day of August, 2006

JON W. DUDAS
*Director of the United States Patent and Trademark Office*